Figure 1:
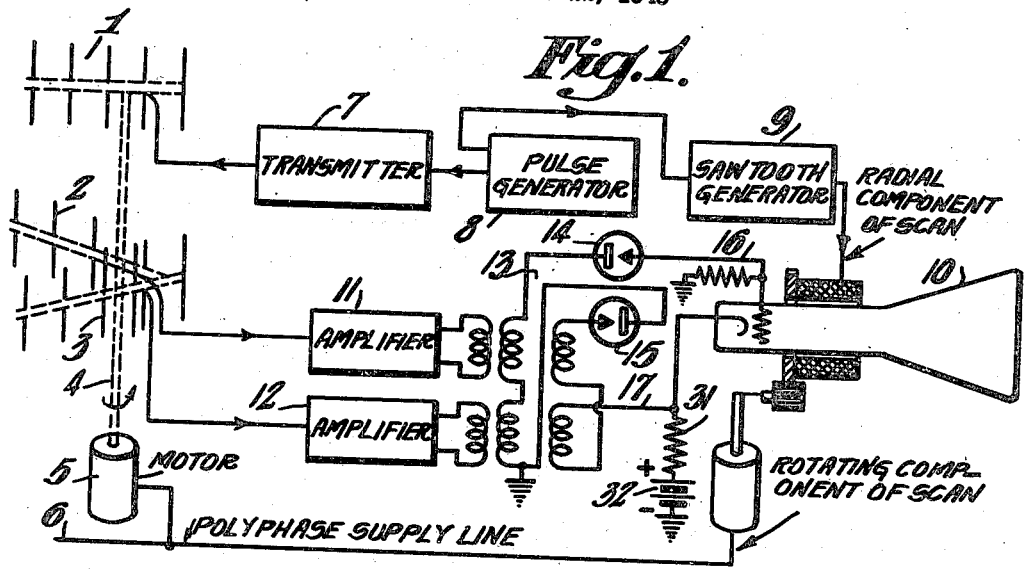

Patented Dec. 21, 1948

2,456,666

UNITED STATES PATENT OFFICE 2,456,666

RADIO DIRECTION FINDING SYSTEM

Charlton Stanford Agate, Esher, and Arthur Henry Cooper, Iver, England, assignors to Electric & Musical Industries Limited, Hayes, England, a company of Great Britain Application November 22, 1943, Serial No. 511,242
In Great Britain September 25, 1941

Section 1, Public Law 690, August 8, 1946
Patent expires September 25, 1962

16 Claims. (Cl. 343—113)

This invention relates to radio direction finding systems in which the directional bearing of a transmitter or a reflector of transmitted signals is indicated by the equality of two signals obtained by means of two aerial systems differently directed.

It is well known that such equality can give an accurate measure of the bearing whereas apparatus providing an indication by means of a maximum signal requires aerial systems of much greater directivity and hence complexity.

It has, for example, been proposed to obtain an indication of a bearing by means of a cathode ray tube in which the electron beam is rotated in synchronism with a rotating transmitting aerial, signals reflected from an object, the direction of which is to be indicated, being used to render the beam visible as a spot or other trace in a position related to the direction of received signals. It would clearly be an advantage to reduce the size and complexity of the rotating aerial system while still retaining a positive indication rather than the null indication which follows from the normal methods of detecting equality.

It is known also to use two directional aerials having a given angular relation to each other and to switch the signals from the aerials alternately to an indicating meter, a null reading indicating the position of balance between the signals received and thus the direction of the source of signals. The null reading may, however, also indicate that no signal is being received and the actual condition can only be ascertained by turning the aerials away from the null position and observing any change in the indication.

The object of the present invention is to provide an indication free from ambiguity and which does not depend on reference to any variation obtained on either side of the true direction.

According to the present invention, apparatus for providing a visual indication of the direction of a source or a reflector of wireless signals, includes two directional rotary receiving aerials and means controlling the application of the signals picked up by said aerials to a circuit connected to an indicating device, said circuit being arranged to feed to said device rectified signals which are representative of the sum and also of the difference of the signals picked up by said aerials in such a manner that said device produces no indication unless the signals received by the separate aerials are substantially equal in intensity.

In one application of the invention the indicating device is constituted by a cathode ray tube provided with means for causing the electron beam thereof to be rotated synchronously with said aerials and preferably the electron beam of the cathode ray tube is normally maintained invisible by an appropriate biassing potential applied to its modulating electrode and only rectified signals representing substantial equality between signals picked up by said aerials serve to render the beam visible. Unbalanced rectified signals on either side of the true direction maintain the beam invisible.

A particular form of apparatus embodying the invention and arranged to provide a visual indication of the direction of a reflector of wireless signals includes a transmitting directional aerial fed by a pulse modulated wireless transmitter, a pair of receiving aerials having their polar diagrams angularly spaced, said transmitting and receiving aerials being mounted for synchronous rotation and means controlling the application of the signals picked up by said aerials to a circuit connected to an indicating device, said circuit being arranged to feed to said device rectified signals which are representative of the sum and also of the difference of the signals picked up by said aerials in such a manner that said device produces no indication unless the signals received by the separate aerials are substantially equal in intensity.

Figure 2:
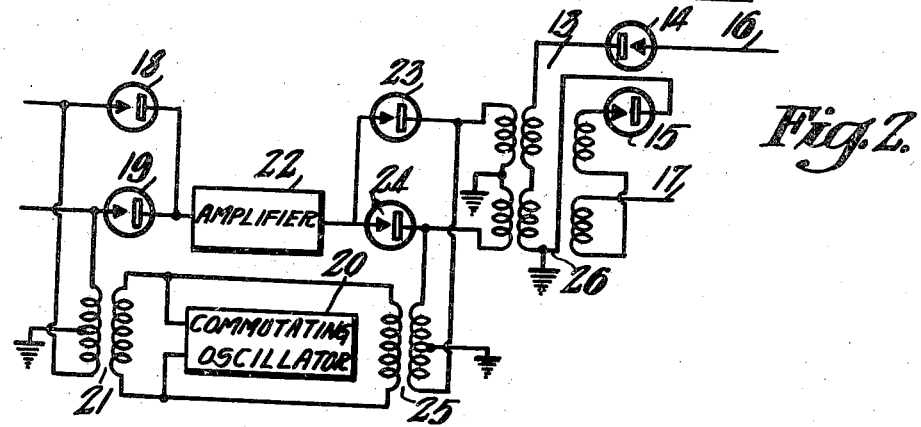
Figure 3:
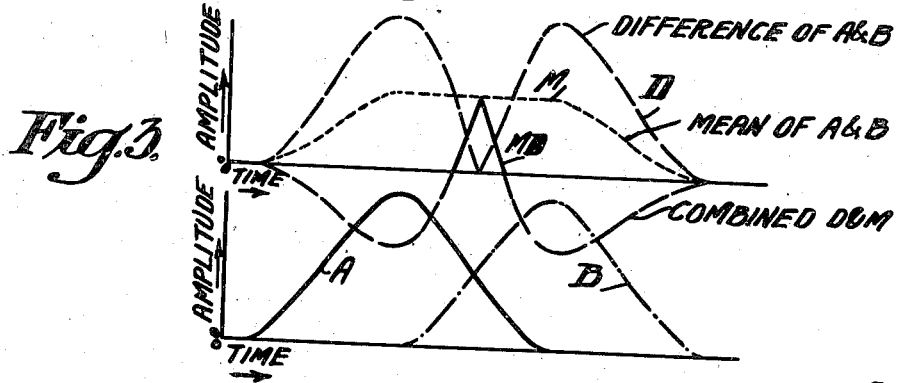

In order that the invention may be more clearly understood and readily carried into effect, alternative forms of apparatus operating in accordance therewith will now be described in greater detail by way of example with reference to the accompanying drawing in which Figure 1 is a block and circuit diagram of one embodiment of the invention, Figure 2 is a block and circuit diagram showing an alternative arrangement which may replace part of the apparatus shown in Fig. 1, and Figure 3 is a group of graphs that are referred to in explaining the invention.

Referring to Fig. 1 of the drawings, the aerial system consists of three directional arrays including a transmitting aerial 1 and two splayed receiving aerials 2 and 3. The whole aerial system is rotatably mounted upon a vertical shaft 4 driven by a polyphase motor 5 connected to a supply line 6.

The transmitting aerial is fed by a transmitter 7 through a slip ring arrangement, not shown. The transmitted output is modulated by switching pulses from a pulse generator 8 which also supplies switching pulses controlling the frequency of a saw-tooth waveform generator 9 providing a radial component of scan for the electron beam of a cathode ray tube 10, the scanning means not being shown. A rotating component is also applied to the electron beam from the polyphase source of supply so that the beam is caused to rotate in synchronism with the aerial system.

The transmitted signals, after reflection from an object such as an aircraft to be located, are received by the aerials 2 and 3 which are connected, as shown in the drawing, to individual amplifiers 11 and 12, the outputs from which are combined in a transformer 13 having its windings disposed in a well known manner to provide an output representing the sum or mean of the outputs from the amplifiers 11 and 12 and another output representing the difference between those outputs. The sum and difference outputs are applied respectively to rectifiers 14 and 15, the rectified voltages being applied to the control grid of the cathode ray tube 10. The lead 16 applies the rectified sum or mean output directly to the control grid of the cathode ray tube and the lead 17 applies the rectified difference output to the cathode biasing circuit for the cathode ray tube, that circuit including, for example, a resistor 31 and a biasing battery 32.

In the operation of the arrangement described, the receiving aerials 2 and 3 are arranged so that the maxima of their response curves are divergent, their overall responses in combination with the transmitting aerial 1 being represented by the curves A and B in Fig. 3. The dotted line curves D, M and MD in the drawing represent respectively the difference, the mean and the combined mean and difference response curves of the two aerials 2 and 3.

The operating voltages applied to the cathode ray tube 10 from sources not shown, are such that the rotating electron beam which would otherwise appear as a rotating radial trace on the fluorescent screen of the tube, is suppressed and only appears when signals of equal intensity are picked up by the aerials 2 and 3, thus indicating the direction of the object reflecting the signals radiated by the transmitter 1.

This result is achieved by selecting a standing bias potential for the control grid of the cathode ray tube such that the electron beam is normally invisible although the rotating and radial deflecting fields are operating. While any difference exists between the intensity of the signals picked up by the aerials 2 and 3, as will be the case in all positions of the aerials except that in which the received signals are on the axis of symmetry of the two aerials, the resulting rectified difference output is applied in the correct sense to maintain the beam suppressed. When the received signals are on the axis of symmetry of the two aerials, the signals picked up will be equal in intensity and the rectified output from the sum channel will raise the control grid potential sufficiently positively to render the beam visible and thus provide an indication of the direction of the reflecting object.

The acuity of the indication depends upon the signal strength and can be made as great or as little as necessary for the examination of any particular signal by control of the relative output from the sum and difference channels and of the standing beam-suppressing bias potential.

In an alternative arrangement, the material modifications of which are shown in Fig. 2, the signals from the aerials 2 and 3 are applied to rectifiers 18 and 19 which are rendered alternately operative by bias potentials applied in push-pull from a commutating oscillator 20, the frequency of which is such that several complete oscillations are delivered during the pulse length of the signal from the transmitter 1. The oscillator 20 is coupled by a transformer 21 to the input side of the rectifiers 18 and 19. The output from these rectifiers is amplified by a common amplifier 22 which may be a signal frequency amplifier. The output is taken to two rectifiers 23 and 24 which are commutated synchronously with the rectifiers 18 and 19 by the commutating oscillator 20 which is coupled for this purpose to the output side of the rectifiers 23 and 24 by a transformer 25. The two output channels are thus reformed and are combined by a transformer 26 corresponding with the transformer 13 in Fig. 2 and providing the controlling potentials for the cathode ray tube 10 for rendering the beam invisible except when an output is delivered by the difference channel.

It will of course be understood that the rotating electron beam may normally be continuously visible as a circle and that the bearing indication may be provided by a spot interruption in the circular trace, this effect being produced by appropriately relating the bias potential at the modulator electrode of the cathode ray tube and the applied signal potentials.

We claim as our invention:

1. Apparatus for providing a visual indication of the direction of a source or a reflector of wireless signals including two directional rotary receiving aerials, a circuit and an indicating device having a control means, means for applying the signals picked up by said aerials to said circuit, said circuit comprising means for adding the signals picked up by said aerials to produce a sum or mean output, means for subtracting said signals from each other to produce a difference output, means for applying said difference output to said control means with a polarity tending to keep said indicating device from producing an indication, and means for applying said sum or mean output to said control means with a polarity tending to make said indicating device produce an indication whereby it produces an indication only when the signals received by the separate aerials are substantially equal in intensity.

2. Apparatus according to claim 1, wherein the indicating device is constituted by a cathode ray tube provided with means for causing the electron beam thereof to be rotated synchronously with said aerials, and wherein there is means for biasing the tube normally to electron beam cut-off whereby only rectified signals representing substantial equality between signals picked up by said aerials serve to render the beam visible.

3. Apparatus for providing a visual indication of the direction of a reflector of wireless signals including a transmitting directional aerial fed by a pulse modulated wireless transmitter, a pair of receiving aerials having their polar diagrams angularly spaced, said transmitting and receiving aerials being mounted for synchronous rotation, a circuit and an indicating device having a control means, means for applying the signals picked up by said aerials to said circuit, said circuit comprising means for adding the signals picked up by said aerials to produce a sum or mean output, means for subtracting said signals from each other to produce a difference output, means for applying said difference output to said control means with a polarity tending to keep said indicating device from producing an indication, and means for applying said sum or mean output to said control means with a polarity tending to make said indicating device produce an indication whereby it produces an indication only when the signals received by the separate aerials are substantially equal in intensity.

4. Apparatus according to claim 1 wherein there are separate amplifiers to which the signals picked up by said aerials are fed, means for obtaining from the outputs of said amplifiers further outputs proportional to the sum and the difference respectively of the signals picked up by said aerials and means for separately rectifying said sum and difference outputs and for supplying said rectified outputs to said indicating device.

5. Apparatus according to claim 1 wherein there are separate rectifiers to which the signals picked up by said aerials are fed and wherein there is a common amplifier to which the outputs of said rectifiers are supplied, two further rectifiers to which the output of said amplifier is supplied, means for obtaining from the outputs of said further rectifiers two outputs proportional to the sum and the difference respectively of the signals picked up by said aerials, means comprising a switching circuit for rendering simultaneously effective for a selected period one of the rectifiers in each of the input and output connections of said amplifier and also for rendering simultaneously effective for a selected period succeeding said first-mentioned period the others of the rectifiers in each of the input and output connections of said amplifier.

6. Apparatus for providing a visual indication of the direction of a source or a reflector of wireless signals including two directional rotary receiving aerials, a circuit and an indicating device having a control means, means for applying the signals picked up by said aerials to said circuit, said circuit comprising means for adding the signals picked up by said aerials to produce a sum or mean output, means for subtracting said signals from each other to produce a difference output, means for applying said difference output to said control means with a polarity tending to keep said indicating device from producing an indication, and means for applying said sum or mean output to said control means with a polarity tending to make said indicating device produce an indication whereby it produces an indication only when the signals received by the separate aerials are substantially equal in intensity, said circuit including separate rectifiers to which the signals picked up by said aerials are fed and including a common amplifier to which the outputs of said rectifiers are supplied said circuit also including two further rectifiers to which the output of said amplifier is supplied and means for obtaining from the outputs of said further rectifiers two outputs proportional to the sum and the difference respectively of the signals picked up by said aerials, means comprising a switching circuit for rendering simultaneously effective for a selected period one of the rectifiers in each of the input and output connections of said amplifier and also for rendering simultaneously effective for a selected period succeeding said first-mentioned period the others of the rectifiers in each of the input and output connections of said amplifier whereby said switching circuit operates to render a rectifier in the input connections to said amplifier and a rectifier in the output connections simultaneously effective for periods which are short compared with the duration of the signals received by said aerials.

7. In a direction finding system, a receiver comprising a pair of receiving aerials having their polar diagrams angularly spaced, a cathode ray tube having a cathode ray control means for producing a cathode ray indication, means for adding the signals picked up by said aerials to produce a sum output, means for subtracting said signals from each other to produce a difference output, and means for applying said sum output and said difference output to said control means with the two outputs being applied with opposite polarities to produce a cathode ray indication only when said aerial signals are of substantially equal magnitude.

8. In a direction finding system, a receiver comprising a pair of receiving aerials having their polar diagrams angularly spaced, means for rotating said polar diagrams, a cathode ray tube having a cathode ray control means for controlling the cathode ray intensity, means for adding the signals picked up by said aerials to produce a sum output, means for subtracting said signals from each other to produce a difference output, means for biassing said tube substantially to cathode ray cut-off, means for applying said sum output and said difference output to said control means with the two outputs being applied with opposite polarities to produce a cathode ray indication only when said aerial signals are of substantially equal magnitude, and means for rotating said cathode ray in synchronism with the rotation of said polar diagrams.

9. In a direction finding system, a receiver comprising a pair of receiving aerials having their polar diagrams angularly spaced, a cathode ray tube indicator having a cathode electrode and a control electrode, means for adding the signals picked up by said aerials to produce a sum output, means for subtracting said signals from each other to produce a difference output, and means for applying said sum output to one of said electrodes for increasing the cathode ray intensity and means for applying said difference output to the other of said electrodes for decreasing the cathode ray intensity.

10. Apparatus for providing a visual indication of the direction of a source or a reflector of wireless signals including two directional rotary receiving aerials, a circuit and an indicating device, means for applying the signals picked up by said aerials to said indicating device through said circuit, said circuit including means for feeding to said device rectified signals which are representative of the sum and also of the difference of the signals picked up by said aerials in such a manner that said device produces no indication unless the signals received by the separate aerials are substantially equal in intensity, said indicating device comprising a cathode ray tube provided with means for causing the electron beam thereof to be rotated synchronously with said aerials, means for normally maintaining the electron beam of the tube invisible by an appropriate biassing potential applied to its modulating electrode whereby only rectified signals representing substantial equality between signals picked up by said aerials serve to render the beam visible and whereby inequality of the rectified signals results in the production of a biassing potential for said cathode ray tube which maintains the electron beam thereof suppressed.

11. In a direction finding system, a receiver comprising a pair of receiving aerials having their polar diagrams angularly spaced, a cathode ray tube having a cathode ray control means for producing a cathode ray indication, means for adding the signals picked up by said aerials to produce a mean output, means for subtracting said signals from each other to produce a difference output, and means for applying said mean output and said difference output to said control means with the two outputs being applied with opposite polarities to produce a cathode ray indication only when said aerial signals are of substantially equal magnitude.

12. In a radio direction finder, the combination of a receiver, a rotating directive antenna system providing two overlapping and correspondingly rotating reception patterns having an inter-relationship indicative of a line of direction, means for comparing the received energies of the different patterns, means operatively associated with said comparing means for releasing energy in response to a predetermined ratio of the values of the received energies, an oscilloscope adapted to produce an indication responsive to the released energy, means for producing an axial deflection of the beam of the oscilloscope, and means for producing a circular movement of the beam relative to the screen of the oscilloscope, said last-mentioned means being arranged to rotate the beam in synchronism with the rotation of the antenna system whereby the position of the indication as it appears on the screen represents the direction from which energy is received.

13. In a radio direction indicating system in which separate energy is received in accordance with each of a plurality of radiant action patterns having an inter-relationship indicative of a line of direction, said radiant action patterns being scanned through a given cyclic rotation, means for comparing the received energies, means operatively associated with said comparing means for releasing energy in response to a predetermined ratio of the values of the received energies, an indicator having a given sweep cycle, means to synchronize said sweep cycle with the scanning cycle of said patterns, and means to apply the released energy to said indicator to produce an indication at a corresponding point in said sweep cycle.

14. In a radio direction indicating system in which separate signals are received in overlapping radiant action patterns having a zone of equal action indicative of a line of direction, said radiant actions patterns being scanned through a given cyclic rotation, means for comparing the received signals, means operatively associated with said comparing means for releasing energy in response to a predetermined ratio of the values of the received signals, an indicator having a given sweep cycle, means to synchronize said sweep cycle with the scanning cycle of said patterns, and means to apply the released energy to said indicator to produce an indication at a corresponding point in said sweep cycle.

15. In a radio direction indicating system in which separate signals are received over two antennas having overlapping radiant action patterns with a zone of equal action indicative of a line of direction, means for rotating said antennas, means for comparing the received signals, means operatively associated with said comparing means for releasing energy in response to a predetermined ratio of the values of the received signals, an indicator having a given sweep cycle, means to synchronize said sweep cycle with the rotation of said antennas, and means to apply the released energy to said indicator to produce an indication at a corresponding point in said sweep cycle.

16. In a radio direction indicating system in which a signal is transmitted and reradiation signals in response thereto are received from signal reradiating objects in accordance with each of a plurality of radiant action patterns having an inter-relationship indicative of a line of direction, said radiant action patterns being scanned through a given cyclic rotation, means for comparing the received signals, means operatively associated with said comparing means for releasing indicator energy in response to a predetermined ratio of the values of the received signals, an indicator having a given sweep cycle, means to synchronize said sweep cycle with the scanning cycle of said patterns, and means to apply the released indicator energy to said indicator to produce an indication at a corresponding point in said sweep cycle.

CHARLTON STANFORD AGATE.
ARTHUR HENRY COOPER.

REFERENCES CITED

The following references are of record in the file of this patent:

UNITED STATES PATENTS

| Number | Name | Date |
| --- | --- | --- |
| 1,787,992 | McIlvaine | Jan. 6, 1931 |
| 1,868,945 | Kruesi | July 26, 1932 |
| 1,968,068 | Blancard et al. | July 31, 1934 |
| 2,266,038 | Hinman, Jr. | Dec. 16, 1941 |